(12) United States Patent
Ruckh

(10) Patent No.: US 10,744,986 B2
(45) Date of Patent: Aug. 18, 2020

(54) TRANSMITTER UNIT

(71) Applicant: Gustav Magenwirth GmbH & Co. KG, Bad Urach (DE)

(72) Inventor: Stefan Ruckh, Roemerstein (DE)

(73) Assignee: Gustav Magenwirth GmbH & Co. KG, Bad Urach (DE)

( * ) Notice: Subject to any disclaimer, the term of this patent is extended or adjusted under 35 U.S.C. 154(b) by 86 days.

(21) Appl. No.: 15/209,999

(22) Filed: Jul. 14, 2016

(65) Prior Publication Data

US 2017/0015292 A1 Jan. 19, 2017

(30) Foreign Application Priority Data

Jul. 16, 2015 (DE) .......................... 10 2015 111 581

(51) Int. Cl.
| | | |
|---|---|---|
| *B62L 3/02* | (2006.01) | |
| *B60T 11/16* | (2006.01) | |
| *B60T 11/22* | (2006.01) | |
| *F15B 7/08* | (2006.01) | |

(52) U.S. Cl.
CPC .............. *B60T 11/16* (2013.01); *B60T 11/22* (2013.01); *F15B 7/08* (2013.01); *B62L 3/023* (2013.01)

(58) Field of Classification Search
CPC ................................ B60T 11/22; B62L 3/023
See application file for complete search history.

(56) References Cited

U.S. PATENT DOCUMENTS

| | | | | |
|---|---|---|---|---|
| 1,430,746 A | * | 10/1922 | Loughead | ............... B60T 11/22 60/589 |
| 1,537,316 A | | 5/1925 | Lansing | |
| 1,887,880 A | * | 11/1932 | Avery | ..................... B64C 25/44 60/589 |
| 2,246,140 A | * | 6/1941 | Main | ...................... B60T 11/22 60/589 |

(Continued)

FOREIGN PATENT DOCUMENTS

| | | |
|---|---|---|
| DE | 1675250 | 4/1971 |
| DE | 3002850 A1 | 7/1981 |

(Continued)

*Primary Examiner* — F Daniel Lopez
(74) *Attorney, Agent, or Firm* — Reinhart Boerner Van Deuren P.C.

(57) ABSTRACT

In order to improve a transmitter unit, especially for a hydraulic brake system, comprising a housing body, a piston which is arranged in the housing body able to move between a starting disposition and a pressure disposition, a pressure chamber bounded by the housing body and the piston, a reservoir for the supply of hydraulic fluid connected by a connection channel to the pressure chamber, a valve unit, which in an open position allows the connection between the reservoir and the pressure chamber and in a closed position breaks this connection, as well as a connection opening for the routing of pressurized hydraulic fluid from the pressure chamber for example to connected hydraulic brake cylinder, so that an escaping of air bubbles from the pressure chamber is more easily possible, it is proposed that in a functional orientation of the transmitter unit, the connection channel opens into a highest end region of the pressure chamber in regard to a direction of gravity.

46 Claims, 10 Drawing Sheets

(56) References Cited

U.S. PATENT DOCUMENTS

| | | | | |
|---|---|---|---|---|
| 2,258,257 A | * | 10/1941 | Main | B60T 11/22 |
| | | | | 60/589 |
| 2,525,740 A | * | 10/1950 | Trevaskis | B60T 11/22 |
| | | | | 60/589 |
| 2,934,902 A | * | 5/1960 | Anderson | B60T 11/22 |
| | | | | 251/298 |
| 3,406,522 A | * | 10/1968 | Fay | B60T 11/206 |
| | | | | 188/152 |
| 3,545,206 A | | 12/1970 | Belart | |
| 4,210,176 A | | 7/1980 | Emming | |
| 4,910,962 A | * | 3/1990 | Keane | B60T 7/04 |
| | | | | 60/589 |
| 2005/0268608 A1 | | 12/2005 | Ludsteck et al. | |

FOREIGN PATENT DOCUMENTS

| | | |
|---|---|---|
| DE | 4206229 C1 | 3/1993 |
| DE | 10306058 A1 | 8/2004 |
| FR | 994161 A | 11/1951 |
| GB | 2080456 A | 2/1982 |

\* cited by examiner

TRANSMITTER UNIT

CROSS-REFERENCE TO RELATED PATENT APPLICATION

This patent application claims the benefit of German application No. 10 2015 111 581.6, filed Jul. 16, 2015, the teachings and disclosure of which are hereby incorporated in their entirety by reference thereto.

BACKGROUND OF THE INVENTION

The invention concerns a transmitter unit, especially for a hydraulic brake system or for a hydraulic clutch system, comprising a housing body, a piston which is arranged in the housing body able to move between a starting disposition and a pressure position, a pressure chamber bounded by the housing body and the piston, a reservoir for the supply of hydraulic fluid connected by a connection channel to the pressure chamber, a valve unit, which in an open position allows the connection between the reservoir and the pressure chamber and in a closed position breaks this connection, as well as a connection opening for the routing of pressurized hydraulic fluid from the pressure chamber for example to a connected hydraulic brake cylinder.

Such transmitter units are known in the prior art.

However, these have the problem that air bubbles can collect in the pressure chamber and only escape from the pressure chamber with difficulty.

This has the drawback of making more difficult the putting of the hydraulic fluid in the pressure chamber under pressure, on account of the great compressibility of the air bubbles, and sometimes it is no longer even possible to do so.

Therefore, the problem which the invention proposes to solve is to improve a transmitter unit of this kind so that an escaping of air bubbles from the pressure chamber is more easily possible.

SUMMARY OF THE INVENTION

According to the invention, this problem is solved in a transmitter unit of the kind described above in that, in a functional orientation of the transmitter unit, the connection channel opens into a highest end region of the pressure chamber in regard to a direction of gravity.

By a functional orientation of the transmitter unit is meant an orientation of the transmitter unit in which the proper functioning of the transmitter unit can be substantially accomplished.

In particular, it is conceivable that the functional orientation of the transmitter unit is one of several possible functional orientations of the transmitter unit.

The benefit of the solution according to the invention is to be seen in that the air bubbles under the action of gravity float upward in relation to the direction of gravity and thereby escape from the pressure chamber solely through the connection channel opening into the highest end region of the pressure chamber in regard to the direction of gravity.

This accomplishes the effect in simple manner that fewer or even no air bubbles in the pressure chamber hinder the putting under pressure of the hydraulic fluid in the pressure chamber.

As regards the configuration of the housing body, thus far no detailed information has been provided.

The housing body encloses the pressure chamber and at least partly the connection channel and the reservoir is provided in a reservoir tank.

Different designs of the reservoir tank are possible.

One advantageous solution calls for the housing body to enclose the pressure chamber, the reservoir and the connection channel.

This enables a compact design of the transmitter unit, in which the reservoir tank is integrated in the housing body.

But it is also conceivable for the reservoir tank to be separate from the housing body.

This solution affords a flexibility in regard to the structure and disposition of the reservoir tank and the housing body, since the reservoir tank and the housing body form two separate units.

It is conceivable for the housing body to be made from several pieces.

However, it is especially favourable when the housing body is a single piece, since such a solution is structurally simple and requires no additional seals between the individual pieces.

Various materials are conceivable for forming the housing body.

In one advantageous embodiment, the housing body is made of aluminium, especially in a casting process.

In another preferred embodiment, the housing body is made of plastic.

Regarding the configuration of the pressure chamber inside the housing body, thus far no detailed information has been provided.

One advantageous solution calls for a cylinder chamber disposed in the housing body to incorporate the pressure chamber.

It is especially advantageous if the cylinder chamber extends along a cylinder bore axis and that the cylinder bore axis in the functional orientation of the transmitter unit is oriented substantially parallel or obliquely to the direction of gravity, meaning by an orientation of the cylinder bore axis substantially parallel or oblique relative to the direction of gravity an orientation of the cylinder bore axis parallel to the direction of gravity or an inclination of the cylinder bore axis relative to the direction of gravity by an angle of up to 60°, such as up to 50°, especially up to 40°, preferably up to 30°, especially advantageously up to 20°.

This enables a simple design of the transmitter unit, which in addition favours the rising of the air bubbles in the pressure chamber.

In another especially advantageous embodiment the pressure chamber comprises a tapered section, which narrows with increasing extent in the direction of a first mouth opening of the connection channel in the pressure chamber.

In this solution, the air bubbles are guided in especially favourable manner to the first mouth opening of the connection channel.

It is especially advantageous if the tapered section of the pressure chamber narrows increasingly opposite to the direction of gravity in the functional orientation of the transmitter unit, so that the escaping of the air bubbles from the pressure chamber is encouraged in easy manner.

Moreover, it is preferably provided that the tapered section of the pressure chamber narrows continually, since such a solution enables the most unhindered escaping of the air bubbles.

In regard to the configuration of the piston and its disposition in the housing body, thus far no detailed information has been given.

In particular, it is provided that the pressure disposition of the piston comprises a plurality of pressure positions of the piston.

In this way, the piston in the different pressure positions puts hydraulic fluid in the pressure chamber under pressure and in the pressure disposition the piston expels pressurized hydraulic fluid from the pressure chamber by a movement from one of the several pressure positions into another of the several pressure positions, reducing the volume of the pressure chamber.

It is especially favourable to provide a guiding section in the cylinder chamber, in which the piston is disposed and able to move in guided manner.

In particular, the piston in an advantageous embodiment comprises a seal, which bounds and seals off the pressure chamber.

In another preferred embodiment, the seal is disposed on the housing body, especially in the guiding section.

In an especially advantageous embodiment, the seal is disposed in a cross sectional area in the cylinder chamber situated transversely to the direction of movement of the piston, for example, in a groove cutting into a cylindrical wall surface of the cylinder chamber.

In an especially advantageous embodiment, the seal comprises at least one sealing lip, and especially a plurality of sealing lips.

Moreover, it is favourable if the piston is subjected to force in the direction of the starting disposition, maximizing the volume of the pressure chamber.

Thus, the piston in a non-actuated state of the transmitter unit is in the starting disposition.

Various embodiments are conceivable for the application of force to the piston.

For example, the piston is acted on by a piston compression spring.

In another advantageous embodiment, the piston is acted on magnetically.

One advantageous solution calls for providing a first shoulder in the cylinder chamber.

In particular, the first shoulder is arranged between the guiding section of the cylinder chamber and the tapered section of the pressure chamber.

It is especially favourable for the piston compression spring to abut against the first shoulder of the cylinder chamber.

Regarding the arrangement of the valve unit, thus far no detailed information has been provided.

In one advantageous embodiment, the valve unit comprises a valve seat.

For example, the valve seat is provided in the highest end region of the pressure chamber in regard to the direction of gravity in the functional orientation of the transmitter unit.

This ensures, with a simple design, both a secure separation of the pressure chamber from the reservoir by the valve unit in the closed position and an optimal removal of the air bubbles when the valve unit is in the open position.

But other positionings of the valve seat are also conceivable.

For example, the valve seat is arranged at one end of the cylinder chamber facing the connection channel.

In another advantageous embodiment, the valve seat is provided in the tapered section of the pressure chamber.

Regarding the configuration of the valve unit thus far no detailed information has been provided.

One advantageous solution has the valve unit comprising a valve body arranged in the pressure chamber, which co-operates with the valve seat and thereby makes possible an opening and closing of the valve unit in a simple design.

Moreover, it is favourable for the valve body to be subjected to force in the direction of the valve seat.

Various embodiments are conceivable for the exertion of force on the valve body.

For example, the valve body is acted on magnetically, in particular, the valve body comprises a first magnet and the piston a second magnet, wherein a magnetic pole of the first magnet facing the second magnet and a magnetic pole of the second magnet facing the first magnet are identical.

In another especially advantageous embodiment, the valve body is actuated by a compression spring.

An especially advantageous solution has the compression spring abutting against the piston.

In one advantageous embodiment the piston and the valve unit are coupled by a coupling unit.

For example, the piston and the valve unit are coupled by a coupling unit acting in dependence on the piston position.

In an especially preferred embodiment, the coupling unit is active in the starting disposition of the piston and inactive in the pressure disposition of the piston. By an active coupling unit is meant, in particular, that the active coupling unit upon a movement of the piston, for example, relative to the housing body, constrains the valve unit to move along with it, for example, the active coupling unit fixes the positions of the piston and at least one element of the valve unit, such as the valve body, relative to each other, and wherein by an inactive coupling unit is in particular meant that the inactive coupling unit allows a relative movement of the piston relative to the valve unit.

It is especially advantageous if the coupling unit couples the piston and the valve unit so that the coupling unit holds the valve unit in the open position when the piston is in the starting disposition and in the pressure disposition of the piston the coupling unit decouples the valve unit and the piston.

In particular, the coupling unit in the pressure disposition of the piston enables a relative movement of the piston from one of the plurality of pressure positions to another one of the plurality of pressure positions relative to the valve unit standing in the closed position, especially relative to the valve body.

This accomplishes, on the one hand, that whenever the piston is in the starting disposition the valve unit is forced to open and hydraulic fluid can enter the pressure chamber from the reservoir and air bubbles escape from the pressure chamber and on the other hand in an uncoupled state the piston by a movement in a direction which reduces the volume of the pressure chamber can displace pressurized hydraulic fluid from the pressure chamber and at the same time as this movement of the piston the valve unit remains in the closed position.

For example, the coupling unit in the starting disposition of the piston engages by a pulling action with the valve body, so that the valve unit is pulled into the open position when the piston is in the starting disposition, while the coupling unit is inactive in the pressure disposition of the piston, especially in all pressure positions of the piston, in particular the coupling unit in the pressure disposition of the piston enables a relative movement of the piston relative to the valve unit.

In particular, the coupling unit holds the valve unit in the open position against the force of the compression spring for as long as the piston is in the starting disposition.

Moreover, it is conceivable that the valve seat forms an end stop for the valve unit, which in particular releases the coupling between the piston and the valve unit by the coupling unit when the valve unit is positioned in the closed position, for example, occasioned by a movement of the piston out of the starting disposition.

An especially favourable embodiment calls for the coupling unit to comprise a coupling element and a piston-side element acting on the coupling element in the starting disposition of the piston.

In particular, the coupling element of the coupling unit is freely movable relative to the piston-side element in the pressure disposition of the piston, especially in all pressure positions of the piston.

In particular, the piston-side element comprises an end stop for the coupling element, wherein a stopping surface of the coupling element lies against the end stop of the piston-side element in the starting disposition of the piston and in the pressure disposition of the piston the stopping surface of the coupling element moves away from the end stop upon a movement of the piston that reduces the volume of the pressure chamber, especially during a movement of the piston from one of the plurality of pressure positions to another of the plurality of pressure positions reducing the volume of the pressure chamber.

In particular, the piston-side element comprises an annular collar which holds the coupling element.

For example, the piston-side element comprises a guide sleeve and a support sleeve, while preferably the coupling element, especially one designed as a pin with a head situated at the end, is arranged to be freely movable in the guide sleeve and in particular the annular collar holds the coupling element in the guide sleeve.

In another advantageous embodiment, the coupling element is designed as a snap connection, which engages for example with the guide sleeve of the piston-side element and is held by the annular collar.

Such a coupling unit is thus realized in a simple design.

In particular, the valve body of the valve unit and the coupling element of the coupling unit are formed as a single piece.

This enables an embodiment which is both simple and stable.

Regarding the disposition of the connection opening thus far no detailed information has been provided.

Preferably, the connection opening is arranged in an intermediate region of the pressure chamber, which is at a spacing from the highest end region of the pressure chamber in regard to the direction of gravity in the functional orientation of the transmitter unit.

In particular, a part of the pressure chamber is arranged between the intermediate region of the pressure chamber and the highest end region of the pressure chamber in regard to the direction of gravity in the functional orientation of the transmitter unit.

Thus, in advantageous manner, air bubbles floating upward in relation to the direction of gravity under the action of gravity at the highest end region do not enter the connection opening and thus when pressure is applied to the hydraulic fluid in the pressure chamber the pressurized hydraulic fluid which is delivered is largely free of air bubbles.

In particular, the intermediate region is situated beneath the highest end region in regard to the direction of gravity in the functional orientation of the transmitter unit.

If is especially advantageous if a part of the pressure chamber, such as an end section of the pressure chamber, is situated between the mouth opening and the connection opening.

For example, the tapered section is situated between the mouth opening and the connection opening.

In particular, it is provided that the tapered section is situated above the connection opening in regard to the direction of gravity in the functional orientation of the transmitter unit.

For example, a part of the pressure chamber, especially the end section, is situated between the valve seat and the intermediate region.

Advantageously, the valve seat is situated above the intermediate region in regard to the direction of gravity in the functional orientation of the transmitter unit.

For example, the first shoulder is situated between the valve seat and the intermediate region.

In an especially preferred embodiment, the intermediate region is disposed in a guiding end region of the guiding section.

Regarding the configuration of the connection channel thus far no detailed information has been provided.

Basically it would be enough for the connection channel not to run downward to the reservoir in regard to the direction of gravity in the functional orientation of the transmitter unit.

In one advantageous embodiment, the connection channel in the functional orientation of the transmitter unit ascends from the first mouth opening of the connection channel into the pressure chamber to a second mouth opening of the connection channel into the reservoir, especially one which is situated higher than it.

This facilitates the escaping of the air bubbles into the reservoir, so that the connection channel is also at least for the most part free of air bubbles.

Regarding the configuration of the reservoir thus far no detailed information has been provided.

In a preferred embodiment, a collecting region is provided beneath the reservoir relative to the direction of gravity in the functional orientation of the transmitter unit.

This enables a collecting of dirt particles floating in the hydraulic fluid stored in the reservoir in the collecting region, so that few if any contaminants are floating in the hydraulic fluid stored in the reservoir.

Moreover, it is advantageously provided that the connection channel opens into the reservoir above the collecting region relative to the direction of gravity in the functional orientation of the transmitter unit.

In this way, the dirt particles collected in the collecting region remain in the collecting region and hydraulic fluid stored in the reservoir in which there are few floating dirt particles flows from the reservoir into the connection channel, so that few dirt particles enter into the pressure chamber.

Alternatively or additionally, the invention concerns a handlebar fitting for a handlebar-steered vehicle, comprising a fitting housing, wherein a transmitter unit according to one or more of the foregoing features is integrated into the handlebar fitting according to the invention.

In particular, the fitting housing forms the housing body of the transmitter unit.

Preferably the handlebar fitting extends from a fastening region in a direction of extent to an actuation side and the direction of extent runs obliquely to the direction of gravity in a functional orientation of the transmitter unit integrated in the handlebar fitting, in particular the direction of extent makes an angle with the direction of gravity which is less than 60°, preferably less than 50°, especially less than 40°, for example less than 30°, especially less than 20°.

For example, a fastening device is arranged in the fastening region for the fastening of the handlebar fitting to a handlebar of the handlebar-steered vehicle.

In particular, the handlebar fitting has an actuating device, for example comprising a lever, wherein the piston of the transmitter unit is acted upon by the actuating device upon actuating of the actuating device.

Preferably the actuating device is arranged on the actuation side of the handlebar fitting.

In an especially preferred embodiment, an actuation opening is provided on the actuation side of the handlebar fitting, from which the cylinder chamber of the transmitter unit integrated in the handlebar fitting extends into the fitting housing.

Alternatively or additionally, the invention concerns a vehicle comprising a frame and at least two wheels rotatably mounted on the frame, wherein a transmitter unit according to one or more of the foregoing features according to the invention in the functional orientation is arranged on the vehicle when ready to drive, so that the aforementioned benefits of the transmitter unit according to the invention are transferred to the vehicle with arranged transmitter unit.

It is especially advantageous when the functional orientation of the transmitter unit arranged on the vehicle when ready to drive on a horizontal parking surface is oriented substantially parallel or obliquely to the vertical on the horizontal parking surface, wherein by an orientation of the transmitter unit substantially parallel or obliquely to the vertical on the horizontal parking surface is meant a parallel orientation of the transmitter unit to the perpendicular to the horizontal parking surface or an orientation of the transmitter unit at an angle of up to 60°, for example up to 50°, especially up to 40°, preferably up to 30°, especially advantageously up to 20°, relative to the perpendicular to the horizontal parking surface, so that the foregoing benefits can deploy their action in especially favourable manner.

In another especially advantageous embodiment the functional orientation of the transmitter unit arranged on the vehicle when ready to drive on a horizontal parking surface is oriented substantially parallel or obliquely to the direction of gravity and in the opposite direction to the direction of gravity, wherein by an orientation of the transmitter unit oriented substantially parallel or obliquely to the direction of gravity and in the opposite direction is meant an orientation of the transmitter unit which makes an angle with the direction of gravity of at least 120°, for example at least 130°, especially at least 140°, preferably at least 150°, especially preferably at least 160°.

In another preferred embodiment, the functional orientation of the transmitter unit arranged on the vehicle when ready to drive on a horizontal parking surface is oriented substantially parallel or obliquely to a longitudinal median plane of the vehicle and is substantially perpendicular or oblique to a geometrical line of connection defined by the midpoints of the at least two wheels, wherein by an orientation of the transmitter unit substantially parallel or oblique to a longitudinal median plane is meant an orientation of the transmitter unit which makes an angle with the longitudinal median plane of up to 60°, for example up to 50°, especially up to 40°, preferably up to 30°, especially advantageously up to 20°, and wherein by an orientation of the transmitter unit substantially perpendicular or oblique to the line of connection is meant an orientation of the transmitter unit which makes an angle with the line of connection of at least 30°, for example at least 40°, especially at least 50°, preferably at least 60°, especially advantageously at least 70°, and makes an angle of at most 150°, for example at most 140°, especially at most 130°, preferably at most 120°, especially preferably at most 110°.

In particular, one wheel of the at least two wheels is mounted so that it is not steerable and is mounted to rotate in a plane parallel to the longitudinal median plane of the vehicle.

Regarding the nature of the vehicle thus far no detailed information has been provided.

For example, the vehicle on which a transmitter unit designed according to one or more of the foregoing features according to the invention is arranged is a motorized vehicle.

In particular, the vehicle on which a transmitter unit designed according to one or more of the foregoing features according to the invention is arranged is a handlebar-steered vehicle.

In an especially advantageous embodiment, the vehicle on which a transmitter unit designed according to one or more of the foregoing features according to the invention is arranged is a two-wheeled vehicle.

Moreover, it is conceivable that the vehicle on which a transmitter unit according to one or more of the foregoing features according to the invention is arranged has a combination of the foregoing features.

In an especially advantageous embodiment, the transmitter unit arranged on the vehicle is integrated in a handlebar fitting, in particular, the transmitter unit arranged on the vehicle is integrated in a handlebar fitting with one or more of the foregoing features.

For example, it is provided that a housing body of the transmitter unit arranged on the vehicle is formed by a fitting housing of the handlebar fitting.

Further features and benefits of the solution according to the invention are the subject matter of the following specification as well as the drawn representation of several exemplary embodiments.

DETAILED DESCRIPTION OF THE INVENTION

Figure 1:
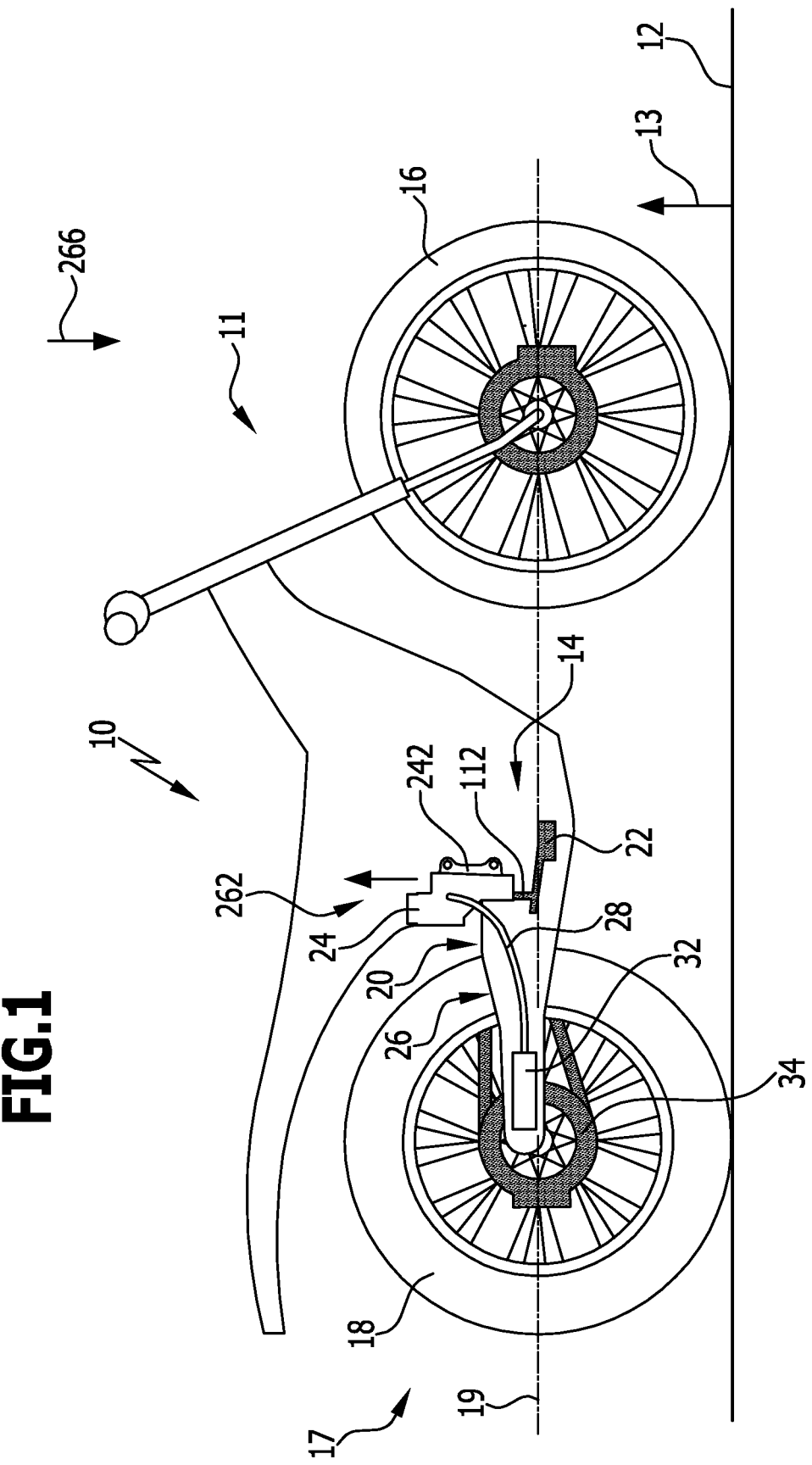
FIG. 1 a schematic representation of a two-wheeled vehicle with a transmitter unit according to the invention arranged on it.

As an example of a handlebar-steered vehicle, FIG. 1 shows a two-wheeled vehicle designated overall as 10, especially a motorcycle, through which runs a longitudinal median plane 11, from a front end region in terms of a straight forward driving direction to a rear end region in terms of a straight forward driving direction, which is parallel to the plane of the drawing in FIG. 1, and which lies when ready to drive on a horizontal parking surface 12, which in FIG. 1 is perpendicular to the plane of the drawing and the perpendicular 13 to the horizontal parking surface 12 in the plane of the drawing of FIG. 1.

The two-wheeled vehicle 10 comprises a frame 14 as well as a rotatably mounted front wheel 16 and a rotatably mounted rear wheel 18 in a rear wheel plane 17, which is parallel to the longitudinal median plane 11 and lies in the plane of the drawing in FIG. 1, wherein a geometrical line of connection 19 is defined by the midpoints of the front wheel 16 and the rear wheel 18.

The two-wheeled vehicle 10 is provided with a hydraulic brake system, designated overall as 20, which comprises an actuating element 22, such as a foot pedal, which acts on a transmitter unit 24.

The transmitter unit 24 is part of a hydraulic system 26, which comprises besides the transmitter unit 24 also a hydraulic line 28, which leads from the transmitter unit 24 to a hydraulic brake cylinder 32, by which a brake unit 34 can be actuated, such as a brake unit 34 coordinated with the rear wheel 18.

To actuate the hydraulic brake cylinder 32, a pressure increase is generated by the transmitter unit 24 in the hydraulic system, which in turn results in an action of the hydraulic brake cylinder 32 on the brake unit 34.

Figure 2:
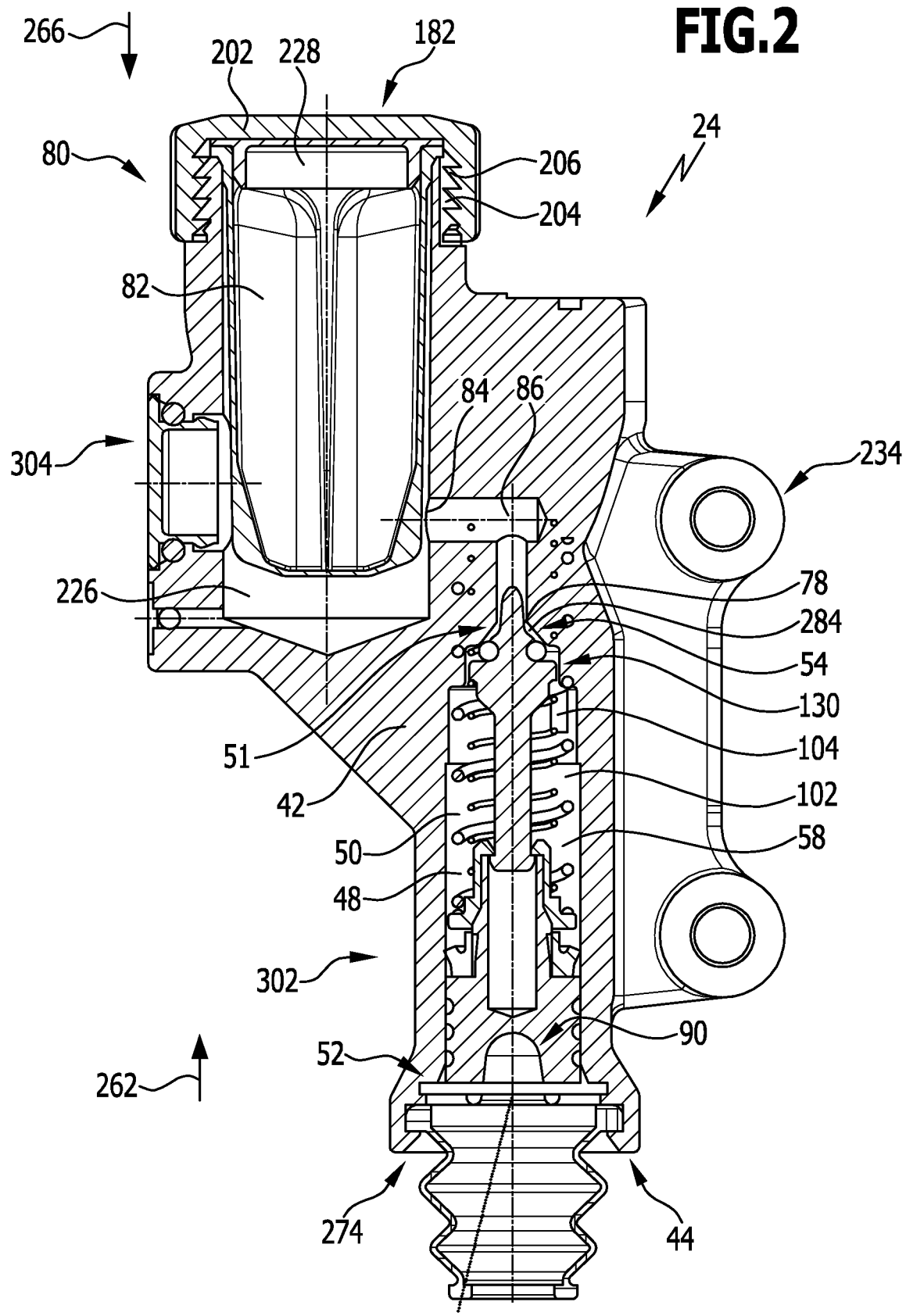
FIG. 2 a cross section through a first exemplary embodiment of a transmitter unit according to the invention.

A first exemplary embodiment of a transmitter unit 24 according to the invention, represented in FIG. 2, comprises a housing body 42, which is in single piece construction, for example, but can also be built up from a plurality of parts.

Figure 3:
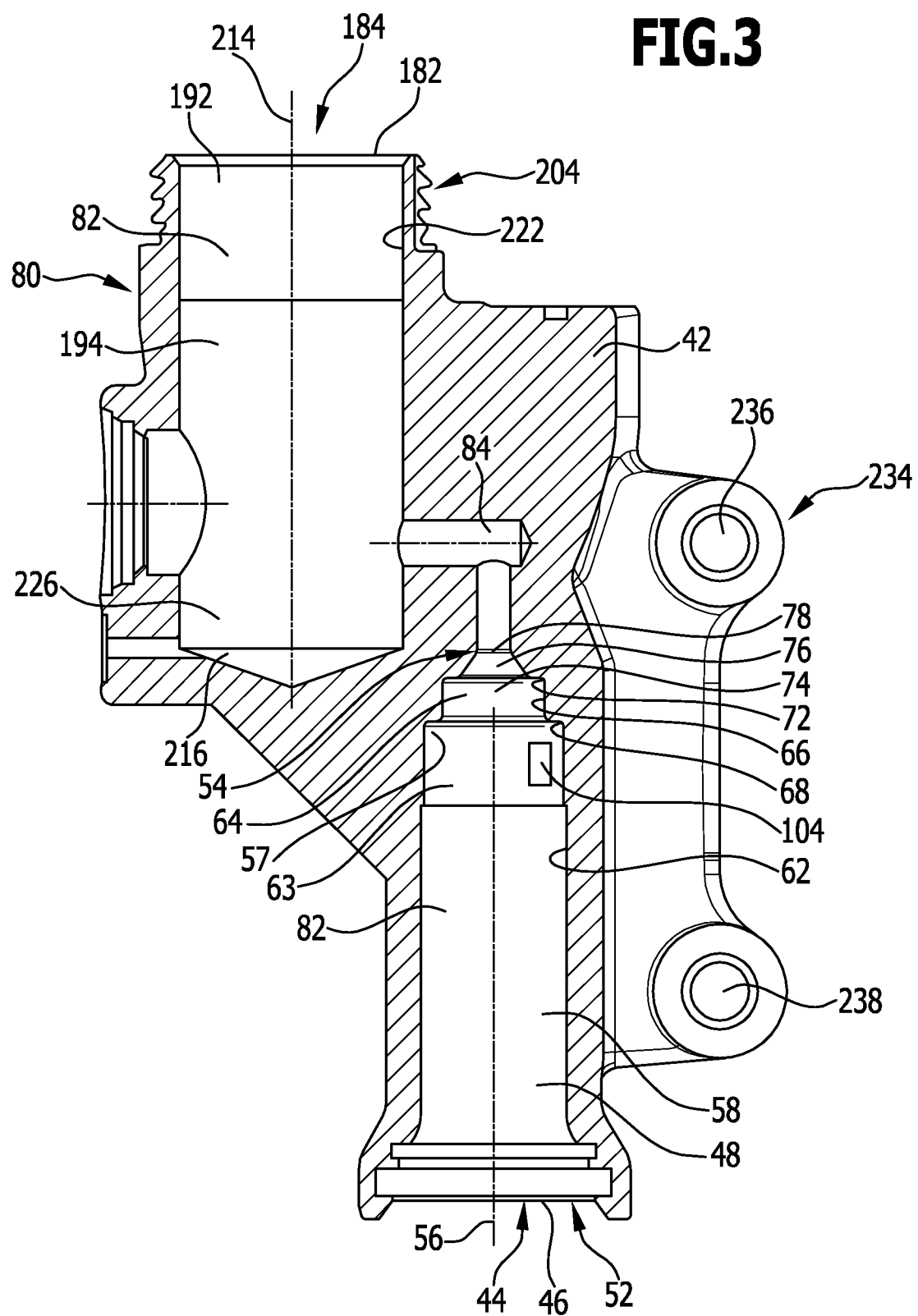
FIG. 3 a cross section through a housing body of the transmitter unit according to FIG. 2 without additionally installed parts.

The housing body 42, which is shown additionally in FIG. 3 without installed parts, has an actuation side 44 with an actuation opening 46, which is turned to face the actuating element 22, for example.

Starting from the actuation opening 46, a cylinder bore designated overall as 48 extends, as shown in FIG. 2, into the housing body 42, which comprises a cylinder chamber 50 and a valve seat 51 of a valve to be described below.

The cylinder bore 48 runs from a first end region 52 facing the actuation opening 46 to a second end region 54 situated in the housing body 42 and extends coaxially to a cylinder bore axis 56 from the first end region 52 to the second end region 54.

The cylinder bore 48 has a guiding section 58 with cylinder wall surfaces 62 running cylindrically to the cylinder bore axis 56 and extending from the first end region 52 to a guiding end region 57, while the cross sectional area of the cylinder bore 48 is constant in the guiding section 58 in geometrical cross sectional planes extending perpendicular to the cylinder bore axis 56.

For example, in an intermediate region 63 of the cylinder bore 48 arranged in the guiding end region 57 a cross sectional area smaller than the cross sectional area in the guiding section 58 is provided in geometrical cross sectional planes extending perpendicular to the cylinder bore axis 56.

Starting from the guiding section 58, an end section 64 of the cylinder bore 48 extends between this and the second end region 54, in which wall surfaces 66 running cylindrically to the cylinder bore axis 56 extend from a first shoulder 68 arranged at the end side of the guiding end region 57 to a second shoulder 72 and form a receiving section 74, which ends at the second shoulder 72.

The receiving section 74 leads, in the end section 64 of the cylinder bore 48, to a tapered section 76, which has for example a shape extending conically to the cylinder bore axis 56, while the tapered section 76 starting from the second shoulder 72 narrows increasingly with increasing extent along the cylinder bore axis 56 in the direction of the second end region 54 and merges into a first mouth opening 78, which is arranged at the second end region 54 and at the end of the cylinder bore 48.

Preferably the first mouth opening 78 is arranged concentrically to the cylinder bore axis 56, but the possibility also exists to provide the first mouth opening 78 offset to the side of the cylinder bore axis 56.

The guiding section 58 and the end section 64 form the cylinder chamber 50, which is in connection with a reservoir 82 of hydraulic fluid, provided in a reservoir tank designated overall as 80, and this by a connection channel 86 connected by a second mouth opening 84 to the reservoir 82 and leading to the first mouth opening 78, so that in the event of loss of hydraulic fluid in the hydraulic system 26 hydraulic fluid can be replenished from the hydraulic fluid supply present in the reservoir 82.

Figure 4:
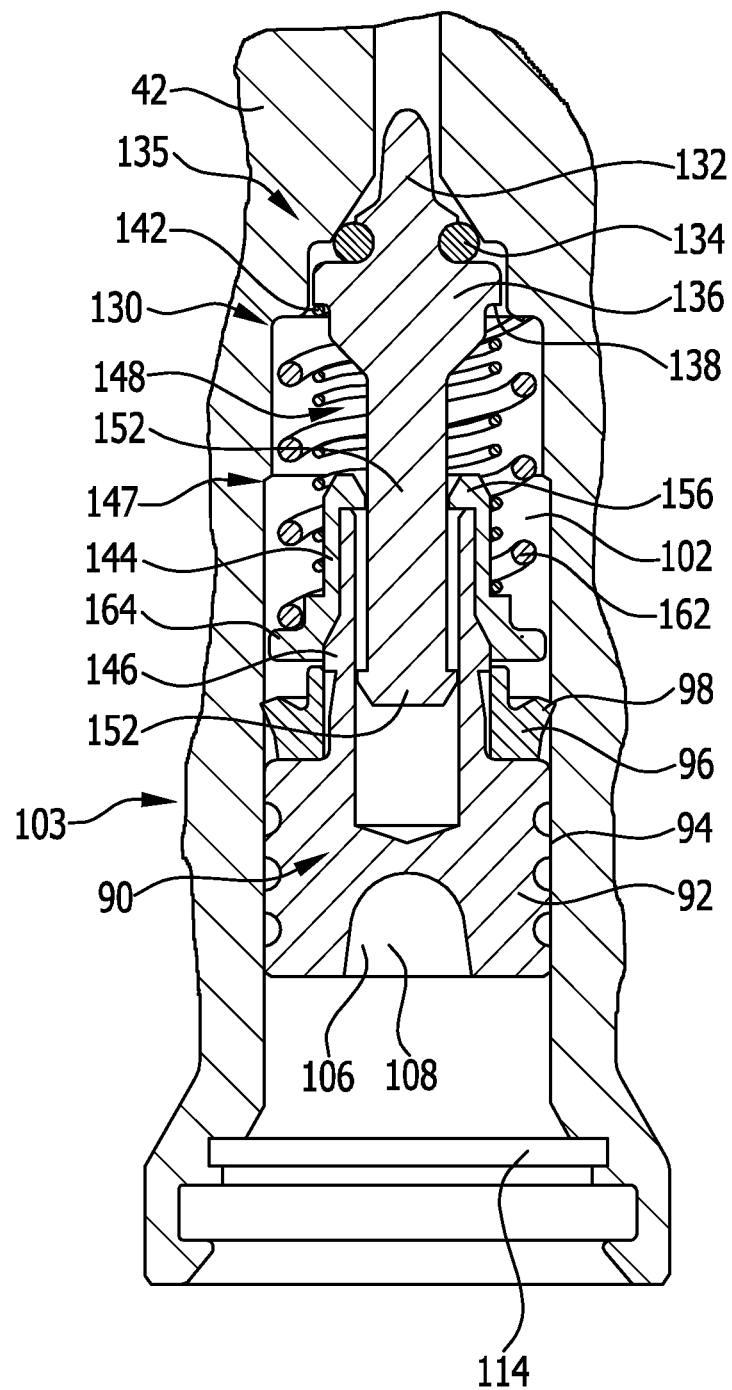
FIG. 4 a partial enlarged representation of the transmitter unit according to FIG. 2, where a valve unit is in a closed position and a piston is in a pressure disposition.
Figure 5:
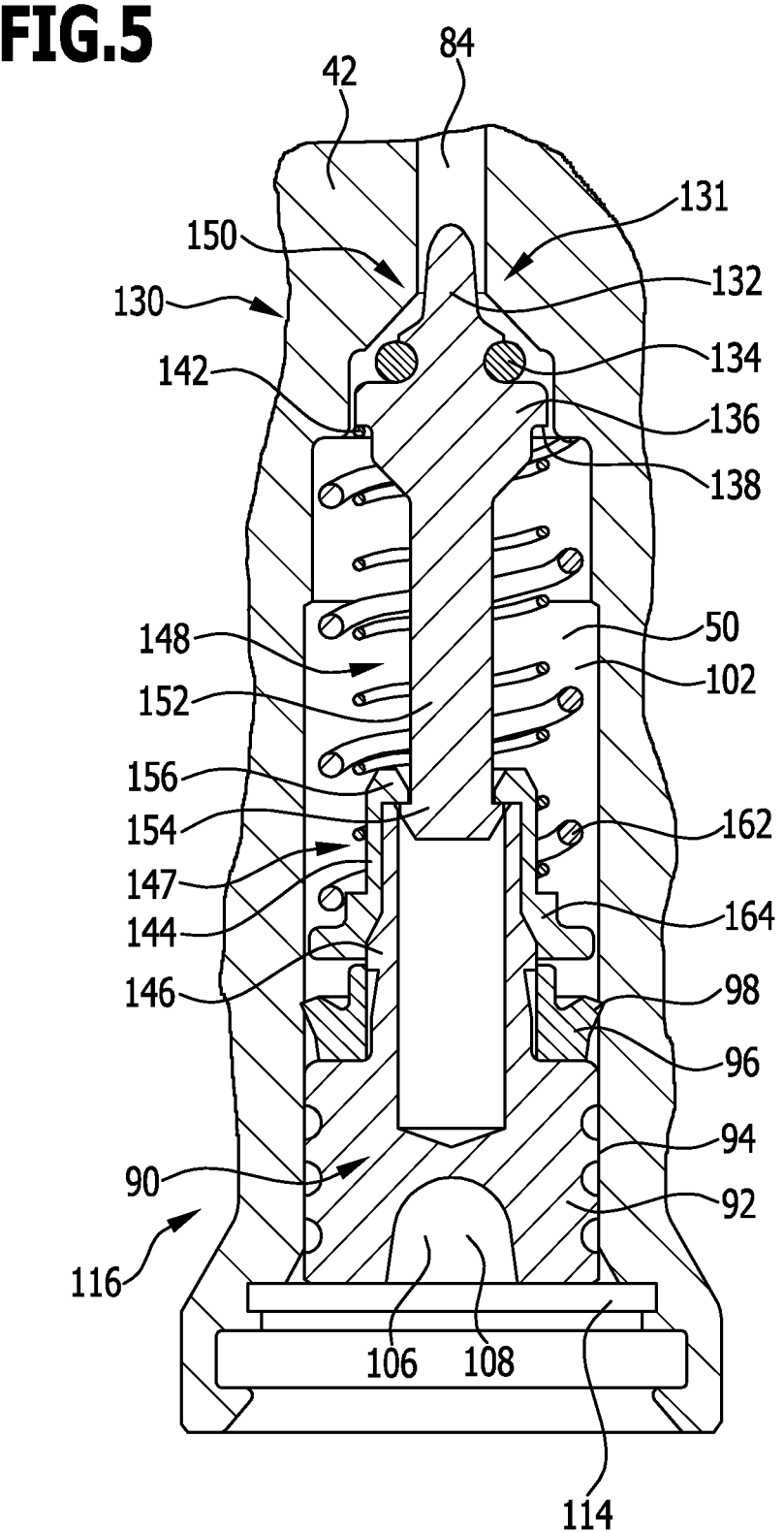
FIG. 5 a partial enlarged representation of the transmitter unit according to FIG. 2, where the valve unit is in an open position and the piston in a starting disposition.

In the cylinder chamber 50, as shown sectionally and enlarged in FIGS. 4 and 5, a piston designated overall as 90 is arranged and able to move in the direction of the cylinder bore axis 56.

The piston 90 comprises a guide body 92, which is guided to slide by its circumferential side 94 against the guiding section 58 of the cylinder bore 48.

Moreover, the piston 90 comprises a seal 96, which is provided for example with a sealing lip 98, which slides tightly against the guiding section 58, the sealing lip 98 being arranged preferably on a side of the guide body 92 of the piston 90 facing the second end region 54.

The piston 90, guided tightly by the seal 96 in the guiding section 58, thus delimits a pressure chamber 102 for hydraulic fluid between the second end region 54 and the piston 90 and in this way makes it possible for the piston 90 to be moved, in a pressure disposition 103 of the piston 90, in the direction of the second end region 54, to reduce the pressure chamber 102 in terms of its volume, and thus to expel a hydraulic fluid from the pressure chamber 102 upon build-up of a pressure rise in the hydraulic fluid.

For this, the pressure disposition 103 of the piston 90 comprises a plurality of pressure positions of the piston 90. The different pressure positions of the piston 90 differ in terms of the volume of the pressure chamber 102 established by them. In the pressure disposition 103 of the piston 90, the piston 90 can move from one of the plurality of pressure positions to another of the plurality of pressure positions and upon movement in the pressure position 103 of the piston 90 from one of the plurality of pressure positions to another pressure position of the plurality of pressure positions which reduces the volume of the pressure chamber 102 the hydraulic fluid in the pressure chamber 102 is put under pressure and expelled from the pressure chamber 102.

In order to conduct hydraulic fluid out of the pressure chamber 102, a connection opening 104 is provided in one side wall of the cylinder bore 48, preferably in a region situated within the end section 64 or within the intermediate region 63, which communicates with the hydraulic line 28 so that hydraulic fluid emerging from the pressure chamber 102 via the connection opening 104 flows by the hydraulic line 28 to the hydraulic brake cylinder 32.

For the movement of the piston 90, the latter is additionally provided with an applying element 106 on a side facing away from the pressure chamber 102, for example one in the form of a recess 108 reaching into the guide body 92, and by means of the applying element 106 an action of the actuating element 22 on the piston 90 occurs.

For example, the actuating element 22 comprises a push rod 112, which reaches through the actuation opening 46 of the housing body 42 and acts on the applying element 106 and thereby engages with the recess 108, for example, in order to actuate the piston 90.

Moreover, when the actuating element 22 is not actuated, the position of the piston 90 in which it is close to the first end region 52 with the applying element 106 is established by a securing element 114, which defines for example as an end stop a starting disposition 116 of the piston 90 in which it has a maximum spacing from the second end region 54.

In order to prevent a back flow of hydraulic fluid from the pressure chamber 102 through the connection channel 86 into the reservoir 82 of the reservoir tank 80 upon a movement of the piston 90 to expel it, there is provided a valve unit, designated overall as 130, which opens when the piston 90 moves back into the starting disposition 116 and thus lets hydraulic fluid flow from the reservoir 82 by the connection channel 86 into the pressure chamber 102 when there is a deficit of hydraulic fluid in the pressure chamber 102 and which closes by way of the movement of the piston 90 to expel hydraulic fluid from the pressure chamber 102.

The valve seat 51 of the valve unit 130 is arranged between the pressure chamber 102 and the reservoir 82, for example at the second end region 54 of the cylinder bore 48, while the tapered section 76 advantageously forms the valve seat 51.

The valve unit 130 comprises a valve body 132 co-operating with the valve seat 51, which carries an O-ring 134 that co-operates with the valve seat 51 in order to prevent a flowing of hydraulic fluid from the pressure chamber 102 into the connection channel 86 in a closed position 135 of the valve unit 130, as represented in FIG. 4.

In particular, the valve body 132 and the O-ring 134 are arranged so as to co-operate with the wall surface of the valve seat 51 in order to enable a reliable closing of the valve unit 130.

Expediently, the valve body 132 is held against a supporting body 136 arranged in the receiving section 74, which has a stop surface 138 for a compression spring 142, which also acts in the same way on the valve body 132 when acted upon by the supporting body 136 in the direction of the valve seat 51, for example in the direction of the second end region 54, and thus presses it together with the O-ring 134 into the valve seat 51 in the closed position 135.

For this, the compression spring 142 is braced against the piston 90, for example against a supporting sleeve 144, which encloses a guiding sleeve 146 formed on the guide body 92 and extending in the direction of the second end region 54, and furthermore is braced against the latter.

Thus, in particular, the valve body 132 with the O-ring 134 is forced in the direction of the valve seat 51 by the compression spring 142, ultimately braced against the piston 90, in the direction of the closed position 135.

In order to furthermore make sure that the valve unit 130 always opens when the piston 90 is at its starting disposition 116, as represented in FIG. 5, the valve body 132 and the piston 90 are coupled by means of a coupling unit 147. The coupling unit 147 affords relative movement between the valve body 132 and the piston 90 in that after the piston 90 has moved a certain distance, the valve body 132 stops moving with the piston 90 but seats on the valve seat as the piston 90 continues to move.

For this, the valve body 132, especially together with the supporting body 136, is coupled by a coupling element 148 of the coupling unit 147 to the piston 90, the coupling element 148 acting on the valve body 132 when the piston 90 is in its starting disposition 116 against the force of the compression spring 142 and moving the valve body 132 with the O-ring 134 away from the valve seat 51 in the direction of the piston 90 and thus holding the valve unit 130 in an open position 150, while in the open position 150 the valve unit 130 allows hydraulic fluid to flow in from the reservoir 82 by the connection channel 86 and the first mouth opening 78.

For example, the coupling element 148 is fashioned as a pin 152, which extends from the valve body 132 in the direction of the piston 90 and has a head 154, which engages with the guiding sleeve 146 and which can move freely therein in the direction of the cylinder bore axis 56, but which is held in engagement with the guiding sleeve 146 in the guiding sleeve 146 by an annular collar 156 of the supporting sleeve 144, especially one extending inward radially to the cylinder bore axis 56 and having an engagement opening.

The annular collar 156 shortly before reaching the starting disposition 116 of the piston 90 holds the head 154 against the force of the compression spring 142 in the guiding sleeve 146 and thus is moved along with the piston 90, removing the head 154 from the valve seat 51, so that the valve unit 130 opens.

If the piston 90 moves away from the starting disposition 116 in the direction of the pressure disposition 103, the head 154 only lies against the annular collar 156 until the valve unit 130 has reached the closed position 135 and then the annular collar 156 moves away from the head 154, now arranged freely in the guiding sleeve 146.

In order to hold the head 154 in the guiding sleeve 146, either the supporting sleeve 144 is firmly joined to the guiding sleeve 146 or the supporting sleeve 144 as shown in the exemplary embodiment described is acted upon by a piston compression spring 162, which holds the supporting sleeve 144 constantly bearing against the guiding sleeve 146.

For this, the piston compression spring 162 on the one hand abuts against the supporting sleeve 144, for example an annular flange 164 of the latter, and on the other hand against the first shoulder 68 of the cylinder bore 48.

Thus, the piston compression spring 162 constantly acts on the piston 90 via the supporting sleeve 144 and the guiding sleeve 146 in the direction of its starting disposition 116 and on the other hand at the same time constantly holds the supporting sleeve 144 bearing against the guiding sleeve 146, which at the same time has the effect of the supporting sleeve 144 acting on the head 154 of the pin 152 by the annular collar 156 in the starting disposition 116 of the piston 90.

The coupling element 148 thus holds the valve body 132 with the O-ring 134 in an opened position corresponding to the open position 150 of the valve unit 130.

The reservoir tank 80 comprises a refill opening 182, which is preferably situated on a side 184 of the housing body 42 opposite the actuation side 44, and is arranged in a first bore end region 192 of a second bore 194 comprising the reservoir 82.

Through the refill opening 182 connected to the reservoir 82 it is possible to replenish the hydraulic fluid supply provided in the reservoir 82, while otherwise, that is as long as the reservoir 82 is not filled, the reservoir 82 needs to be separated from the surroundings outside the reservoir tank 80, and in order to make possible the opening and closing of the refill opening 182 required for this it is provided with an attachable and removable lid 202, so that as needed the refill opening 182 can be opened or closed.

For this, the lid 202 for example is provided with an inner thread 206, fitting an outer thread 204 provided on the first bore end region 192 of the housing body 42, so that the refill opening 182 can be closed by screwing the lid 202 onto the housing body 42 and the lid 202 can be unscrewed for the replenishing of hydraulic fluid in the reservoir 82 and thus the refill opening 182 can be opened.

Starting from the first bore end region 192, the second bore 194 extends coaxially to a second bore axis 214 in the housing body 42 as far as a second bore end region 216 situated in the housing body 42.

In the exemplary embodiment of FIG. 3, the second bore axis 214 is arranged with an offset relative to the cylinder bore axis 56. But it is also conceivable for the second bore axis 214 and the cylinder bore axis 56 to lie on the same axis.

Moreover, it is conceivable for the second bore axis 214 and the cylinder bore axis 56 to run inclined relative to each other.

The second bore 194 has a bore wall surface 222 extending from the first bore end region 192 to the second bore end region 216 cylindrically to the second bore axis 214, enclosing the reservoir 82 communicating with the refill opening 182.

The reservoir 82 communicates by the second mouth opening 84, preferably situated in the bore wall surface 222, with the connection channel 86, the connection channel 86 extending from the second mouth opening 84 to the first mouth opening 78 and thereby connecting the reservoir 82 to the pressure chamber 102.

For example, the second bore end region 216 has a collecting region 226 for dirt particles contaminating the hydraulic fluid kept in the reservoir 82, so that these dirt particles are gathered in the collecting region 226 and do not escape via the second mouth opening 84 into the connection channel 86 and enter the pressure chamber 102.

In order to bound off and seal the reservoir 82, a bellows arrangement 228 arranged for example on the lid is provided in the second bore 194.

In order to fasten the transmitter unit 24 on the two-wheeled vehicle 10, a holding device 234 is arranged preferably on the housing body 42, such as two bores 236 and 238, which can be mounted on a fastening device 242 of the frame 14.

The transmitter unit 24 is arranged, for example by means of the fastening device 242, on the two-wheeled vehicle 10 in a functional orientation 262, by functional orientation 262 meaning an orientation of the transmitter unit 24 in which the transmitter unit 24 can substantially perform its intended function.

The functional orientation 262 represented in FIGS. 1 and 2 is, in particular, one of several possible functional orientations of the transmitter unit 24.

FIG. 2 shows a direction of gravity 266 and the transmitter unit 24 oriented in the functional orientation 262 parallel to and in the opposite direction to the direction of gravity 266.

In this case, the actuation side 44 of the housing body 42 is a side 274 of the housing body 42 situated at the bottom in relation to the direction of gravity 266 in the functional orientation 262 of the transmitter unit 24.

Therefore, the first end region 52 lies below the second end region 54 in relation to the direction of gravity 266 in the functional orientation 262 of the transmitter unit 24.

The cylinder bore axis 56 is, for example, oriented substantially parallel or obliquely to the direction of gravity 266 in the functional orientation 262 of the transmitter unit 24, meaning by an substantially parallel or oblique orientation of the transmitter unit 24 relative to the direction of gravity 266 a parallel orientation of the transmitter unit 24 relative to the direction of gravity 266 or an orientation of the transmitter unit 24 relative to the direction of gravity 266 at an angle of up to 50°, especially up to 40°, preferably up to 30°, especially advantageously up to 20°.

The tapered section 76 preferably narrows substantially antiparallel to the direction of gravity 266 in the functional orientation 262 of the transmitter unit 24, meaning by a narrowing substantially antiparallel to the direction of gravity 266 in particular that the tapered section 76 converges into a cone opposite the direction of gravity 266.

Expediently, the pressure chamber 102 lies above the piston 90 in the cylinder chamber 50 with respect to the direction of gravity 266 in the functional orientation 262 of the transmitter unit 24.

Moreover, the first mouth opening 78 opens into a highest end region 284 of the pressure chamber 102 with respect to the direction of gravity 266 in the functional orientation 262 of the transmitter unit 24.

In particular, the first mouth opening 78 lies beneath the second mouth opening 84 with respect to the direction of gravity 266 in the functional orientation 262 of the transmitter unit 24.

Moreover, the second mouth opening 84 lies above the collecting region 226 of the reservoir 82 with respect to the direction of gravity 266 in the functional orientation 262 of the transmitter unit 24.

Because the collecting region 226 lies in a lowest end region of the second bore 194, especially below the reservoir 82, with respect to the direction of gravity 266 in the functional orientation 262 of the transmitter unit 24, a collecting of dirt particles in it is made possible.

Advantageously, the second bore axis 214 is oriented substantially parallel or obliquely to the direction of gravity 266 in the functional orientation 262 of the transmitter unit 24, meaning by an substantially parallel or oblique orientation of the transmitter unit 24 relative to the direction of gravity 266 a parallel orientation of the transmitter unit 24 relative to the direction of gravity 266 or an orientation of the transmitter unit 24 relative to the direction of gravity 266 at an angle of up to 50°, especially up to 40°, preferably up to 30°, especially advantageously up to 20°.

Thus, the refill opening 182 also lies at a top side of the housing body 42 with respect to the direction of gravity 266 in the functional orientation 262 of the transmitter unit 24.

The above described arrangement enables a self-regulating venting of the pressure chamber 102 in the functional orientation 262 of the transmitter unit 24, since the pressure chamber 102 lies in a lower region 302 of the housing body 42 with respect to the direction of gravity 266 and the reservoir 82 lies in an upper region 304 of the housing body 42 with respect to the direction of gravity 266 in the functional orientation 262 of the transmitter unit 24.

Expediently, the connection channel 86 is configured running from the pressure chamber 102 and substantially ascending up to the reservoir 82 with respect to the direction of gravity 266 in the functional orientation 262 of the transmitter unit 24, so that when the valve unit 130 is placed in the open position 150 any air bubbles present in the pressure chamber 102 escape under the action of gravity from the pressure chamber 102 through the first mouth opening 78, opening into the highest end region 284 of the pressure chamber 102 with respect to the direction of gravity 266 in the functional orientation 262 of the transmitter unit 24 and arrive by way of the connection channel 86 in the reservoir 82.

This reduces the number of air bubbles possibly present in the pressure chamber 102 and in optimal manner there are no longer any air bubbles present in the pressure chamber 102, so that the pressurizing of the hydraulic fluid in the pressure chamber 102 is less affected by air bubbles or not at all.

The configuration of the transmitter unit 24 enables a self-regulating refilling of hydraulic fluid in the pressure chamber 102, because hydraulic fluid stored in the reservoir 82 is available, which when the piston 90 is in the starting disposition 116 and the valve unit 130 in the open position 150 is forced for example by the excess pressure generated by the bellows arrangement 228 through the connection channel 86 and into the pressure chamber 102, where it equalizes the deficit of hydraulic fluid there.

Summarizing, the transmitter unit functions as follows:

In order to place hydraulic fluid in the pressure chamber 102 under pressure, the actuating element 22 is actuated and a force is exerted on the piston 90, so that the piston 90 is moved from the starting disposition 116 in a direction reducing the volume of the pressure chamber.

By the movement of the piston 90 from the starting disposition 116 in a direction reducing the volume of the pressure chamber, the valve body 132 is carried along in the same direction and the valve unit 130 passes over into the closed position 135, so that the hydraulic fluid pressurized in the pressure chamber 102 is expelled from the pressure chamber 102 through the connection opening 104 and passes by way of the hydraulic line 28 to the hydraulic brake cylinder 32, thereby triggering the braking action of the brake unit 34.

If the actuating element 22 is no longer actuated, the piston 90 is returned by the tensioning force of the piston compression spring 162 to the starting disposition 116 and the action of the coupling element 148 opens the valve unit 130.

Figure 6:
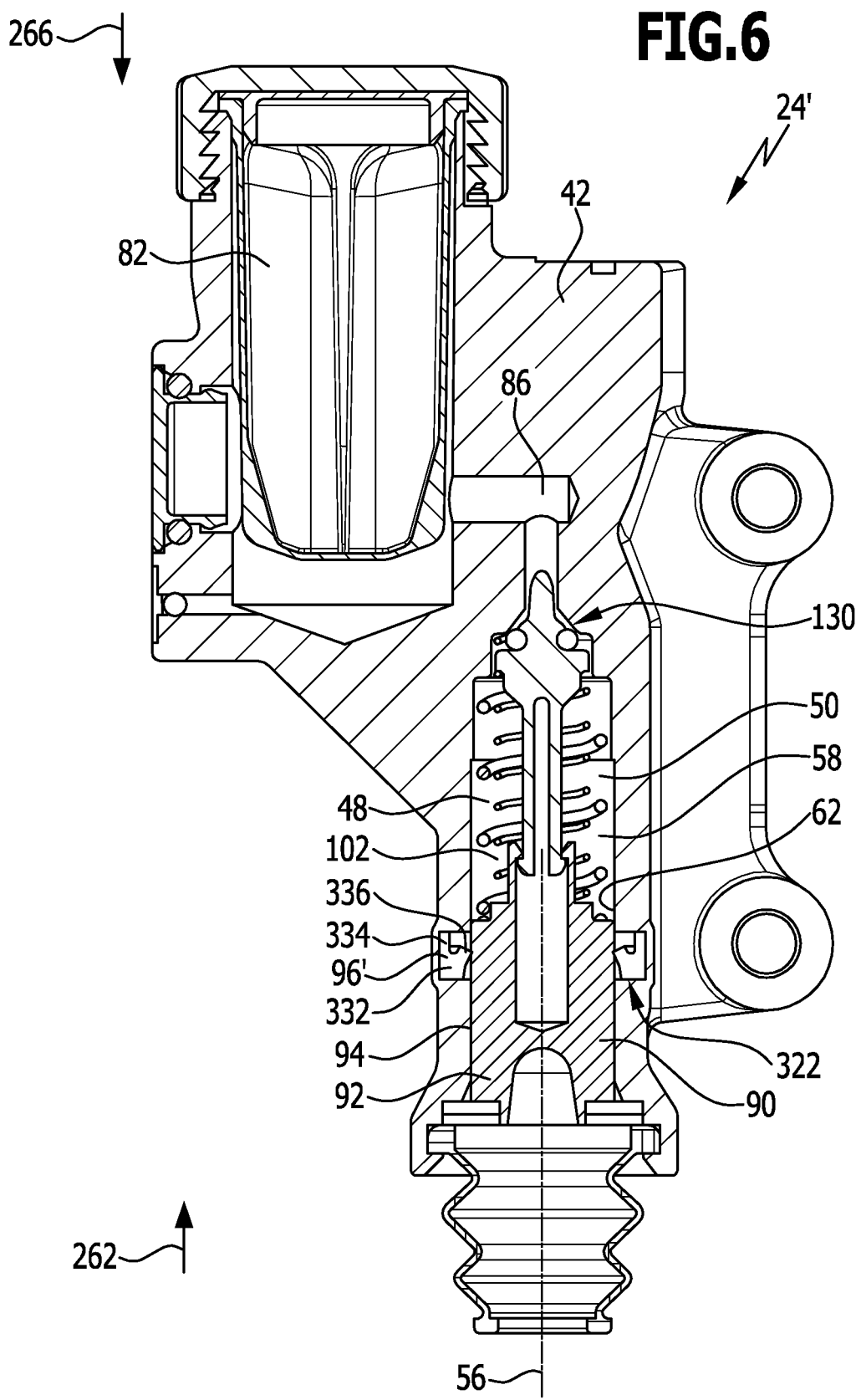
FIG. 6 a cross section similar to FIG. 2 through a second exemplary embodiment of a transmitter unit according to the invention.

In a second exemplary embodiment of a transmitter unit 24' according to the invention, represented in FIG. 6, those parts which are identical to parts of the first exemplary embodiment are provided with the same reference numbers, so that in this regard one can refer entirely to the remarks about the first exemplary embodiment.

In contrast with the first exemplary embodiment, in the second exemplary embodiment the seal 96' is not disposed at the piston 90, but instead in the guiding section 58 on the housing body 42.

For this, the cylinder bore 48 has a groove 322 entirely encircling the cylinder bore axis 56 and cutting into the cylinder wall surface 62, the groove 322 being positioned in the guiding section 58 such that, in all pressure positions of the pressure disposition 103 of the piston 90, a part of the circumferential side 94 of the guide body 92 of the piston 90 lies tightly against the seal 96'.

The groove 322 is dimensioned so that it receives an inner sealing body 332 of the seal 96'. For example, there are a plurality of sealing lips 334 and 336 arranged on the inner sealing body 332, one of the sealing lips 334, 336 lying against an inner wall of the groove 322 and another of the sealing lips 334, 336 being spread apart from the inner sealing body 332 and lying against the piston 90.

Thus, one of the sealing lips 334, 336 forms a sealing line with the housing body 42 and one of the sealing lips 334, 336 forms a sealing line with the piston 90, especially with the circumferential side 94 of the guide body 92, and since the piston 90 in each pressure position of the pressure disposition 103 lies against one of the sealing lips 334, 336 the pressure chamber 102 is closed fluid-tight, especially tight to hydraulic fluid and air.

Moreover, all other parts of the transmitter unit are identical with those of the preceding or the following exemplary embodiment, so that reference is made entirely to the remarks in connection with these exemplary embodiments.

Figure 7:
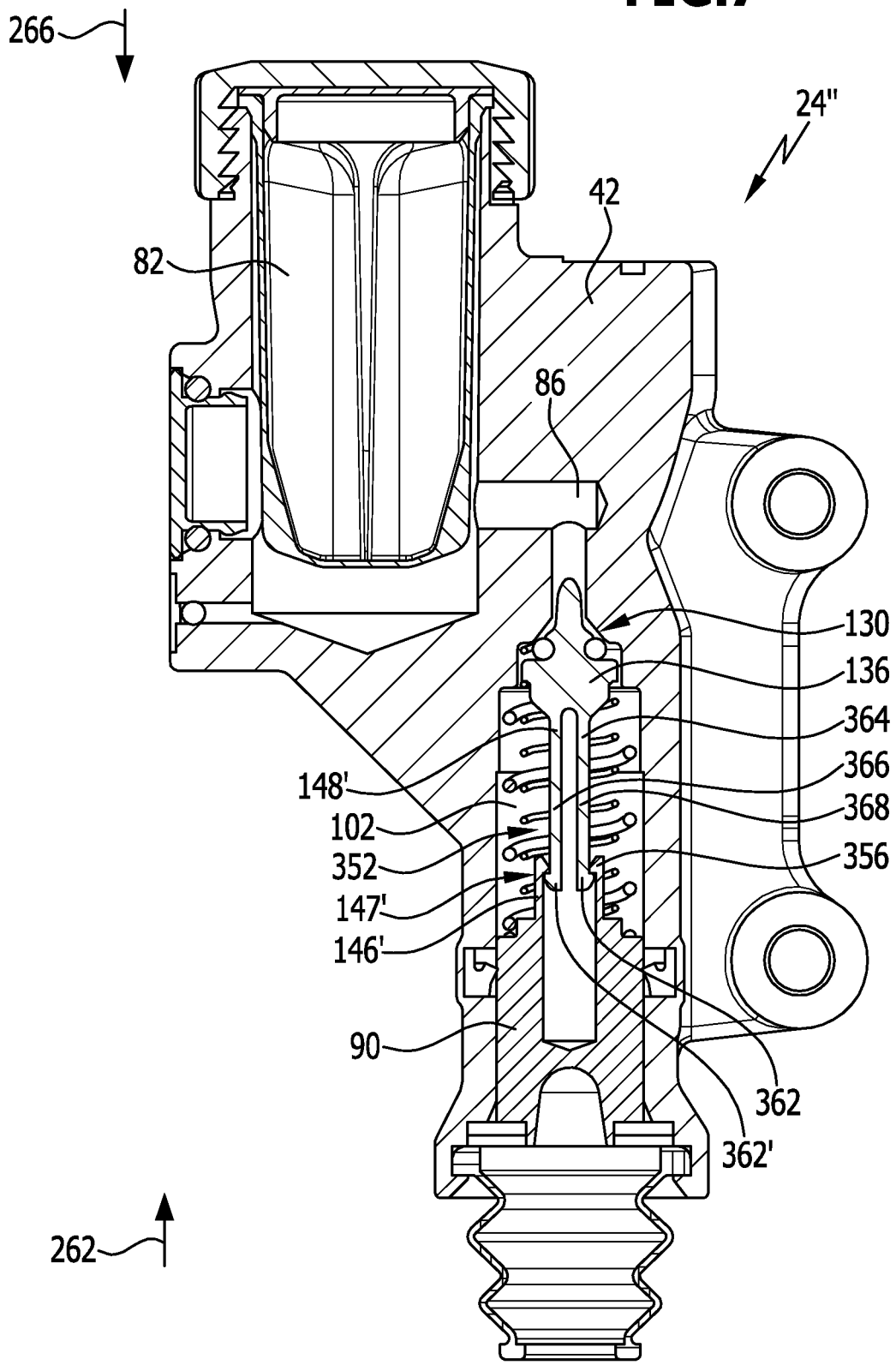
FIG. 7 a cross section similar to FIG. 2 through a third exemplary embodiment of a transmitter unit according to the invention.

In a third exemplary embodiment of a transmitter unit 24" according to the invention, as represented in FIG. 7, those parts which are identical to parts of the preceding exemplary embodiments are provided with the same reference numbers, so that in regard to their specification one can refer entirely to the remarks about the preceding exemplary embodiments.

In contrast with the first exemplary embodiment, the coupling unit 147' in the third exemplary embodiment comprises a snap device 352 engaging with the guiding sleeve 146'.

An annular collar 356, especially one extending radially inward to the cylinder bore axis 56 and having an engagement opening, encloses the opening of the guiding sleeve 146' and serves as an end stop for a coupling shoulder 362 of the coupling element 148', configured in this embodiment as a snap element 364 spreading radially to the cylinder bore axis 56.

For example, the snap element 364 comprises two arms 366 and 368, each with two opposing longitudinal ends, the arms 366, 368 being arranged on the supporting body 136 at one of their longitudinal ends and having the coupling shoulder 362, 362' at the other longitudinal end.

The arms 366 and 368 of the snap element 364 can be pressed together radially inwardly in a direction transverse to their lengthwise dimension, so that the coupling shoulders 362 and 362' lie close to each other and can be inserted into the guiding sleeve 146' through the opening of the guiding sleeve 146' partly covered by the annular collar 356. In an unaffected disposition, the arms 366 and 368 spread apart in a radial direction relative to the cylinder bore axis 56, so that the coupling shoulders 362 and 362' are spread apart and the annular collar 356 holds the arms 366 and 368 against their coupling shoulders 362 and 362' in the guiding sleeve 146'.

The functioning of the coupling unit 147' with the snap device 352, especially the interacting of the annular collar 356 with the snap element 364 and its coupling shoulder 362, occurs in similar manner to the coupling unit 147, especially the annular collar 156 and the head 152, so that reference can be made in this regard to the remarks about the first exemplary embodiment.

Moreover, all other parts are identical with those of the preceding exemplary embodiments, in particular the coupling unit 147' can be combined with the seal 96 according to the first exemplary embodiment as well as with the seal 96' according to the second exemplary embodiment, so that reference is made entirely to the remarks in connection with these exemplary embodiments.

Figure 8:
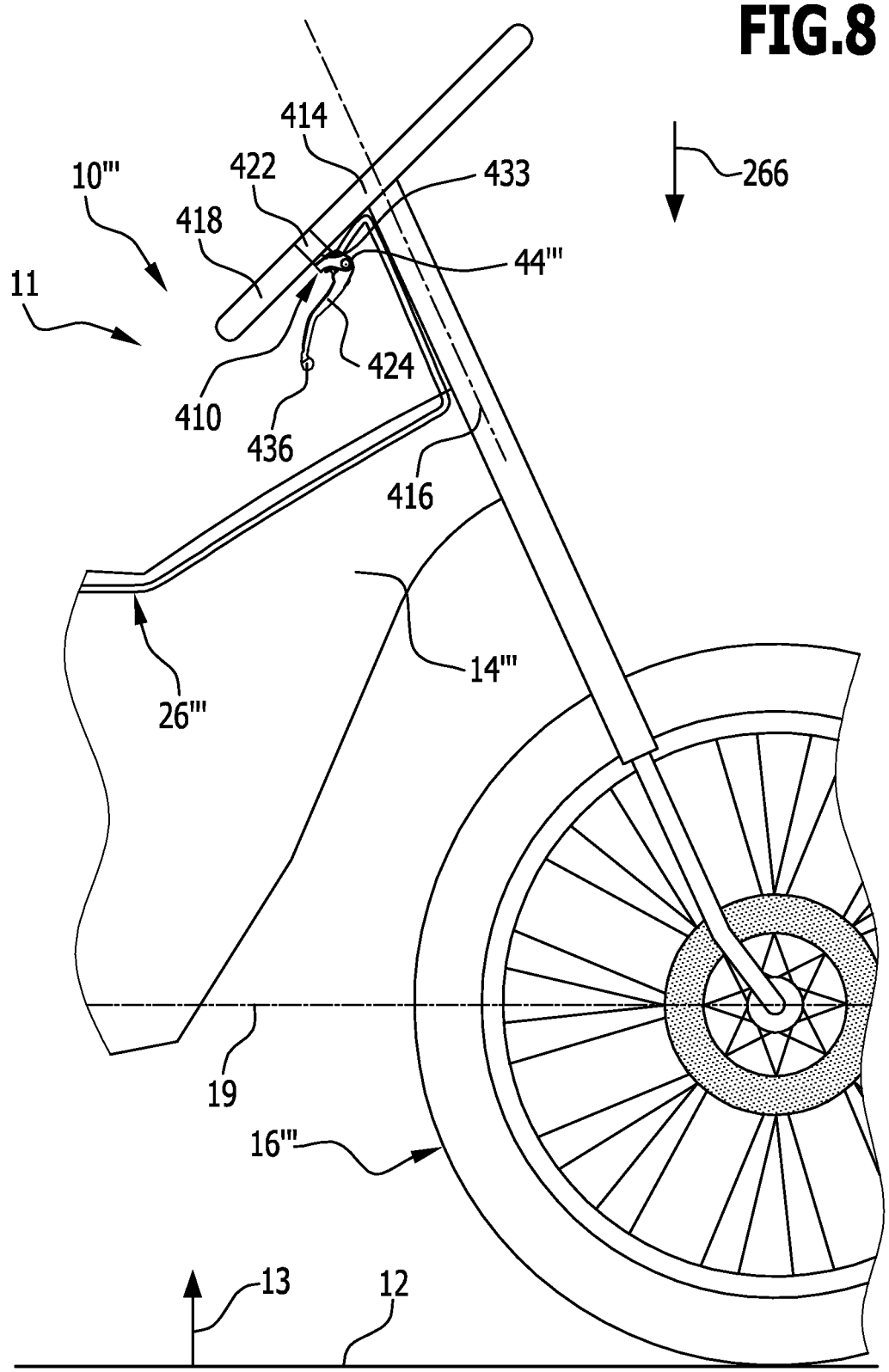
FIG. 8 a partial representation of a handlebar-steered vehicle with a handlebar fitting according to the invention, in which a transmitter unit is integrated, according to a fourth exemplary embodiment.
Figure 9:
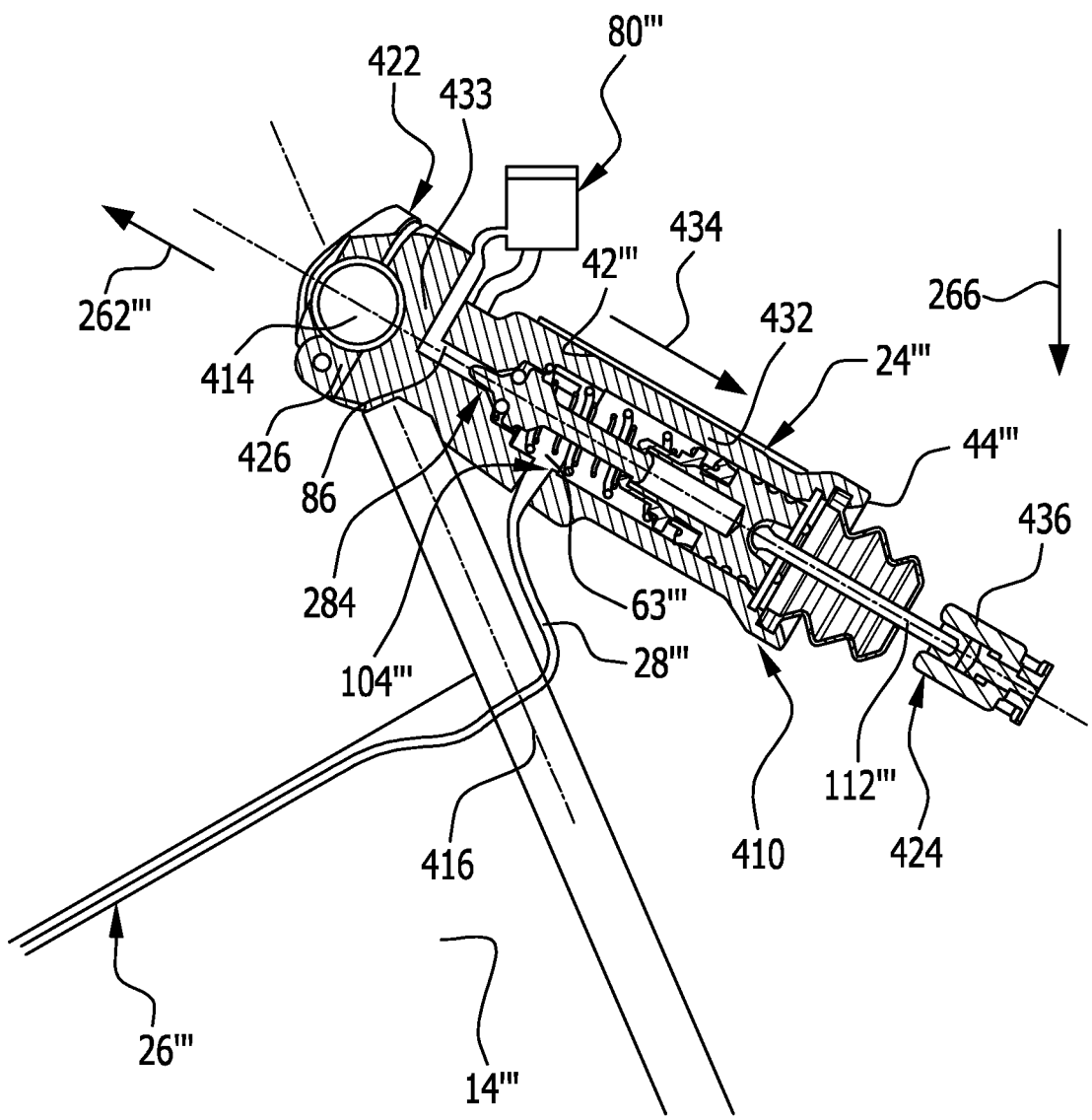
FIG. 9 a partial enlarged representation according to FIG. 8 in a region of a handlebar of the handlebar-steered vehicle, the handlebar fitting being shown in a sectional view, and FIG. 10 another cross section through a handlebar with the handlebar fitting according to the fourth exemplary embodiment.
Figure 10:
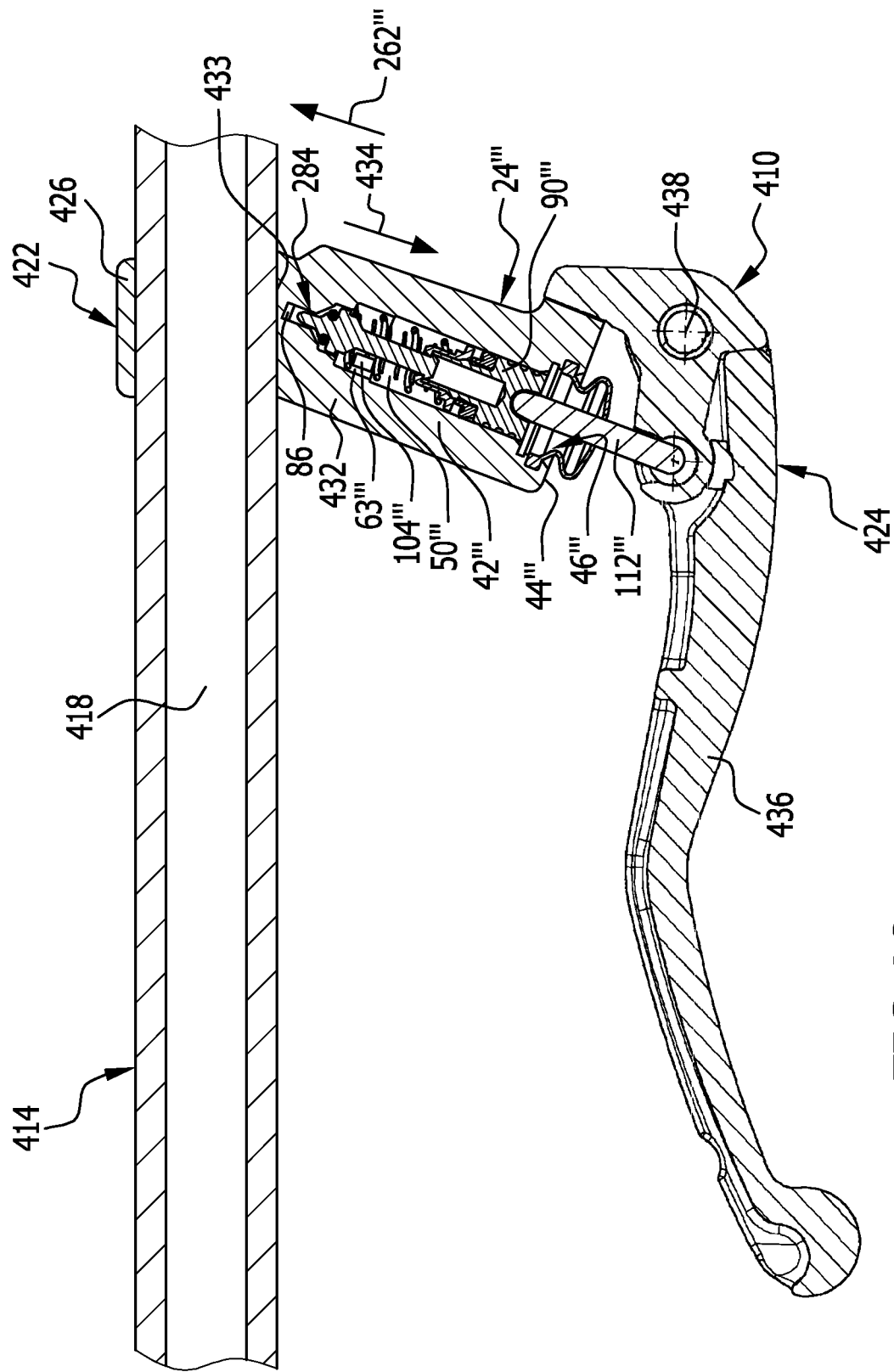

In a fourth exemplary embodiment of a transmitter unit 24″ according to the invention, represented for example in FIGS. 8, 9 and 10, those parts which are identical to parts of the preceding exemplary embodiments are provided with the same reference numbers, so that in regard to their specification one can refer entirely to the remarks about the preceding exemplary embodiments.

In the fourth exemplary embodiment, a transmitter unit 24″ is integrated in a handlebar fitting 410 for a handlebar-steered vehicle 10‴.

The handlebar-steered vehicle 10‴ comprises a handlebar 414, which is arranged on a frame 14‴ of the vehicle 10‴ and able to rotate about a steering axis 416, and with which a front wheel 16‴ of the vehicle 10‴ can be steered.

In a region of a handlebar grip 418 of the handlebar 414, the handlebar fitting 410 is arranged with a fastening device 422, so that a driver of the vehicle 10‴ with one hand positioned on the handlebar grip 418 can operate an actuating device 424 of the handlebar fitting 410.

The handlebar fitting 410 is configured as a suspended handlebar fitting 410, so that when the vehicle 10‴ standing on a horizontal parking surface 12 is ready to drive, the handlebar fitting 410 is arranged substantially beneath the handlebar 414 with respect to the direction of gravity 266.

For example, a locking piece 426 of the fastening device 422 embraces the handlebar 414 and the handlebar fitting 410 extends from the locking piece 426 slanting downward in regard to the direction of gravity 266 and slanting forward in relation to the straight forward driving direction of the vehicle 10‴.

In particular, a fitting housing 432 extends from a fastening region 433, in which the fastening device 422 is arranged, in a direction of extent 434 up to an actuation side 44‴.

The direction of extent 434 runs inclined to the direction of gravity 266 with the handlebar fitting 410 arranged on the handlebar 414 in a functional orientation 262‴, for example, at an angle to the direction of gravity 266 which is at most 60°.

The actuating device 424 comprises a lever 436, which is arranged on the fitting housing 432 and able to pivot about a lever axis 438, as well as a push rod 112‴ arranged on the lever 436.

The fitting housing 432 forms a housing body 42‴ for the transmitter unit 24‴.

The fitting housing 432 encloses a cylinder chamber 50‴, in which a piston 90‴ is movably arranged.

The push rod 112‴ reaches through an actuation opening 46‴ of the fitting housing 432, which is arranged on the actuation side 44‴, into the cylinder chamber 50‴ and when the lever 436 is operated the push rod 112‴ acts on the piston 90‴.

A reservoir tank 80‴ containing the reservoir 82 is configured as a separate tank in this exemplary embodiment and arranged with a fastening element on the handlebar fitting 410.

In one variant, however, the reservoir tank 80‴ is integrated in the handlebar fitting 410, so that the fitting housing 432 incorporates the reservoir tank 80‴.

The transmitter unit 24‴ is connected by a connection opening 104‴ to a hydraulic line 28‴ of a hydraulic system 26‴.

The hydraulic system 26‴ is, for example, a hydraulic system of a hydraulic clutch system.

In one variant, the hydraulic system 26‴ is part of a hydraulic brake system.

The connection opening 104‴ is arranged in an intermediate region 63‴ of the cylinder chamber 50‴, the intermediate region 63‴ being at a spacing from the highest end region 284 with respect to the direction of gravity 266 in a functional orientation 262‴ of the transmitter unit 24‴.

Moreover, all other parts are identical with those of the preceding exemplary embodiments, so that reference is made entirely to the remarks in connection with these exemplary embodiments.

The invention claimed is:

1. Transmitter unit, comprising a housing body, a piston which is arranged in a cylinder chamber of the housing body able to move between a starting disposition and a pressure disposition, a pressure chamber bounded by the housing body and the piston, a reservoir for the supply of hydraulic fluid connected by a connection channel to the pressure chamber, a valve unit, which in an open position opens the connection channel between the reservoir and the pressure chamber and in a closed position closes the connection channel, as well as a connection opening for the routing of pressurized hydraulic fluid from the pressure chamber, wherein the connection opening is provided in the housing body,
   in a functional orientation of the transmitter unit, the connection channel opens into a highest end region of the pressure chamber in regard to a direction of gravity,
   wherein the cylinder chamber extends along a cylinder bore axis and in that the cylinder bore axis in the functional orientation of the transmitter unit is oriented substantially parallel or obliquely to the direction of gravity,
   wherein the piston and the valve unit are coupled by a coupling unit,
   wherein the coupling unit couples the piston and the valve unit so that the coupling unit holds the valve unit in the open position when the piston is in the starting disposition and in the pressure disposition of the piston the coupling unit permits relative movement between the valve unit and the piston; and
   wherein the valve unit includes a valve body, wherein the valve body is acted on by a compression spring, wherein the compression spring abuts against the piston;
   wherein the compression spring is provided outside the piston.

2. Transmitter unit according to claim 1, wherein
   the transmitter unit further comprises a piston compression spring that acts on the piston separate from said compression spring, wherein the piston compression spring is provided in the pressure chamber.

3. Transmitter unit according to claim 1, wherein the housing body encloses the pressure chamber, the reservoir and the connection channel.

4. Transmitter unit according to claim 1, wherein the housing body is a single piece.

5. Transmitter unit according to claim 1, wherein the housing body is made of plastic.

6. Transmitter unit according to claim 1, wherein the pressure chamber comprises a tapered section, which narrows with increasing extent in the direction of a first mouth opening of the connection channel in the pressure chamber.

7. Transmitter unit according to claim 6, wherein the tapered section of the pressure chamber narrows increasingly opposite to the direction of gravity in the functional orientation of the transmitter unit.

8. Transmitter unit according to claim 7, wherein the tapered section of the pressure chamber narrows continually.

9. Transmitter unit according to claim 1, wherein the pressure disposition of the piston comprises a plurality of pressure positions of the piston.

10. Transmitter unit according to claim 1, wherein a guiding section is provided in the cylinder chamber, in which the piston is disposed and able to move in guided manner.

11. Transmitter unit according to claim 1, wherein the piston is subjected to force in the direction of the starting disposition, maximizing the volume of the pressure chamber.

12. Transmitter unit according to claim 11, wherein the piston is acted on by a piston compression spring.

13. Transmitter unit according to claim 1, wherein a first shoulder is provided in the cylinder chamber.

14. Transmitter unit according to claim 13, wherein the first shoulder is arranged between a guiding section defined by the cylinder chamber and a tapered section defined by the pressure chamber.

15. Transmitter unit according to claim 13, wherein a piston compression spring abuts against the first shoulder of the cylinder chamber.

16. Transmitter unit according to claim 1, wherein the valve unit comprises a valve seat.

17. Transmitter unit according to claim 16, wherein the valve seat is provided in the highest end region of the pressure chamber in regard to the direction of gravity in the functional orientation of the transmitter unit.

18. Transmitter unit according to claim 16, wherein the valve seat is provided in a tapered section of the pressure chamber.

19. Transmitter unit according to claim 16, wherein the valve body is arranged in the pressure chamber and co-operates with the valve seat.

20. Transmitter unit according to claim 16, wherein the valve body is subjected to force in the direction of the valve seat.

21. Transmitter unit according to claim 1, wherein the coupling unit comprises a coupling element and a piston-side element acting on the coupling element in the starting disposition of the piston.

22. Transmitter unit according to claim 1, wherein the valve body of the valve unit and a coupling element of the coupling unit are formed as a single piece.

23. Transmitter unit according to claim 1, wherein the connection opening is arranged in an intermediate region of the pressure chamber, which is at a spacing from the highest end region of the pressure chamber relative to the direction of gravity in the functional orientation of the transmitter unit, the connection opening being an opening leading outwards the pressure chamber to a hydraulic line.

24. Transmitter unit according to claim 1, wherein a part of the pressure chamber is arranged between a first mouth opening of the connection channel in the pressure chamber and the connection opening.

25. Transmitter unit according to claim 24, wherein the connection channel in the functional orientation of the transmitter unit rises from the first mouth opening of the connection channel in the pressure chamber to a second mouth opening of the connection channel in the reservoir.

26. Transmitter unit according to claim 1, wherein a collecting region is provided beneath the reservoir relative to the direction of gravity in the functional orientation of the transmitter unit.

27. Handlebar fitting for fastening to a handlebar including the transmitter unit according to claim 1, wherein a housing of the handlebar fitting provides the housing body of the transmitter unit and includes a handlebar fastening region adapted to fasten to the handlebar.

28. Vehicle, comprising a frame and at least two wheels rotatably mounted on the frame, wherein a transmitter unit according to claim 1 in the functional orientation is arranged on the vehicle when ready to drive.

29. Vehicle according to claim 28, wherein the transmitter unit arranged on the vehicle is integrated in a handlebar fitting that additionally includes a handlebar fastener region.

30. An assembly comprising: a hydraulic brake system or a hydraulic clutch system that incorporates the transmitter unit of claim 1.

31. Transmitter unit of claim 1, wherein the connection opening routes pressurized hydraulic fluid from the pressure chamber to a connected hydraulic brake cylinder.

32. Transmitter unit of claim 1, wherein the connection opening is provided in a sidewall of the cylinder chamber.

33. Transmitter unit according to claim 1, wherein the compression spring surrounds the piston, at least partly.

34. Transmitter unit, comprising a housing body, a piston which is arranged in a cylinder chamber of the housing body able to move between a starting disposition and a pressure disposition, a pressure chamber bounded by the housing body and the piston, a reservoir for the supply of hydraulic fluid connected by a connection channel between the reservoir and the pressure chamber and in a closed position closes the connection channel, as well as a connection opening for the routing of pressurized hydraulic fluid from the pressure chamber, wherein the connection opening is provided in a housing body,
- in a functional orientation of the transmitter unit, the connection channel opens into a highest end region of the pressure chamber in regard to a direction of gravity,
- wherein the cylinder chamber extends along a cylinder bore axis and in that the cylinder bore axis in the functional orientation for the transmitter unit is oriented substantially parallel or obliquely to the direction of gravity,
- wherein the piston and the valve unit are coupled by a coupling unit,
- wherein the coupling unit coupes the piston and the valve unit to that the coupling unit holds the valve unit in the open position when the piston is in the starting disposition and in the pressure disposition of the piston the coupling unit permits relative movement between the valve unit and the piston;
- wherein the valve unit includes a valve body, wherein the valve body is acted on by a compression spring, wherein the compression spring abuts against the piston, and
- the transmitter unit further comprising a piston compression spring that acts on the piston separate from said compression spring, wherein the piston compression spring is provided in the pressure chamber;
- wherein a collecting region is provided beneath the reservoir relative to the direction of gravity in the functional orientation of the transmitter unit, and
- wherein the connection channel opens into the reservoir above the collecting region relative to the direction of gravity in the functional orientation of the transmitter unit.

35. Handlebar fitting for fastening to a handlebar including a transmitter unit, the transmitter unit comprising:

a housing body, a piston which is arranged in a cylinder chamber of the housing body able to move between a starting disposition and a pressure disposition, a pressure chamber bounded by the housing body and the piston, a reservoir for the supply of hydraulic fluid connected by a connection channel to the pressure chamber a valve unit, which in an open position opens the connection channel between the reservoir and the pressure chamber and in a closed position closes the connection channel, as well as a connection opening for the routing of pressurized hydraulic fluid from the pressure chamber, wherein the connection opening is provided in a housing body, in a functional orientation of the transmitter unit, the connection channel opens into a highest end region of the pressure chamber in regard to a direction of gravity, wherein the cylinder chamber extends along a cylinder bore axis and in that the cylinder bore axis in the functional orientation of the transmitter unit is oriented substantially parallel or obliquely to the direction of gravity, wherein the piston and the valve unit are coupled by a coupling unit, wherein the coupling unit couples the piston and the valve unit so that the coupling unit holds the valve unit in the open position when the piston is in the starting disposition and in the pressure disposition of the piston the coupling unit permits relative movement between the vale unit and the piston, wherein the valve unit includes a valve body, wherein the valve body is acted on by a compression spring, wherein the compression spring abuts against the piston;

the transmitter unit further comprising a piston compression spring that act on the piston separate from said compression spring, wherein the piston compression spring is provided in the pressure chamber;

wherein a housing of the handlebar fitting provides the housing body of the transmitter unit and that includes a handlebar fastening region adapted to fasten to the handlebar; and wherein the housing body extends from the fastening region in a direction of extent to an actuation side and that the direction of extent runs obliquely to the direction of gravity in a functional orientation of the transmitter unit.

36. A Handlebar fitting for fastening to a handlebar, comprising a handlebar fitting housing and a transmitter unit;

wherein the handlebar fitting housing includes a handlebar fastening region adapted to fasten to the handlebar and provides a housing body of the transmitter unit;

the transmitter unit comprising:

the housing body, a piston which is arranged in a cylinder chamber of the housing body able to move between a starting disposition and a pressure disposition, a pressure chamber bounded by the housing body and the piston, a reservoir for the supply of hydraulic fluid connected by a connection channel to the pressure chamber, a valve unit, which in an open position opens the connection channel between the reservoir and the pressure chamber and in a closed position closes the connection channel, as well as a connection opening for the routing of pressurized hydraulic fluid from the pressure chamber, wherein the connection opening is provided in the housing body, in a functional orientation of the transmitter unit, the connection channel opens into a highest end region of the pressure chamber in regard to a direction of gravity;

wherein the cylinder chamber extends along a cylinder bore axis and in that the cylinder bore axis in the functional orientation of the transmitter unit is oriented substantially parallel or obliquely to the direction of gravity;

wherein the piston and the valve unit are coupled by a coupling unit;

wherein the coupling unit couples the piston and the valve unit so that the coupling unit holds the valve unit in the open position when the piston is in the starting disposition and in the pressure disposition of the piston the coupling unit permits relative movement between the valve unit and the piston; and wherein the housing body extends from the fastening region in a direction of extent to an actuation side and that the direction of extent runs obliquely to the direction of gravity in a functional orientation of the transmitter unit.

37. Transmitter unit, comprising a housing body, a piston which is arranged in a cylinder chamber of the housing body able to move between a starting disposition and a pressure disposition, a pressure chamber bounded by the housing body and the piston, a reservoir for the supply of hydraulic fluid connected by a connection channel to the pressure chamber, a valve unit, which in an open position opens the connection channel between the reservoir and the pressure chamber and in a closed position closes the connection channel, as well as a connection opening for the routing of pressurized hydraulic fluid from the pressure chamber, wherein the connection opening is provided in the housing body, in a functional orientation of the transmitter unit, the connection channel opens into a highest end region of the pressure chamber in regard to a direction of gravity, wherein the cylinder chamber extends along a cylinder bore axis and in that the cylinder bore axis in the functional orientation of the transmitter unit is oriented substantially parallel or obliquely to the direction of gravity, wherein the piston and the valve unit are coupled by a coupling unit, wherein the coupling unit couples the piston and the valve unit so that the coupling unit holds the valve unit in the open position when the piston is in the starting disposition and in the pressure disposition of the piston the coupling unit permits relative movement between the valve unit and the piston; and wherein the valve unit includes a valve body, wherein the valve body is acted on by a compression spring, wherein the compression spring abuts against the piston;

wherein the compression spring surrounds the piston.

38. Transmitter unit according to claim 37, wherein a part of the piston that is surrounded by the compression spring is a part of the coupling unit.

39. Transmitter unit according to claim 37, wherein a guide body of the piston is free of the compression spring and mounted slidable along a guiding section of the housing body.

40. Transmitter unit, comprising a housing body, a piston which is arranged in a cylinder chamber of the housing body able to move between a starting disposition and a pressure disposition, a pressure chamber bounded by the housing body and the piston, a reservoir for the supply of hydraulic fluid connected by a connection channel to the pressure chamber, a valve unit, which in an open position opens the connection channel between the reservoir and the pressure chamber and in a closed position closes the connection channel, as well as a connection opening for the routing of pressurized hydraulic fluid from the pressure chamber, wherein the connection opening is provided in the housing body, in a functional orientation of the transmitter unit, the connection channel opens into a highest end region of the pressure chamber in regard to a direction of gravity,
wherein the housing body is a single piece providing a guiding section for guiding the piston, wherein opposed axial ends of the piston are entirely contained axially within the single piece for axial sliding movement therein;
wherein the piston and the valve unit are coupled by a coupling unit, and
wherein the coupling unit couples the piston and the valve unit so that the coupling unit holds the valve unit in the open position when the piston is in the starting disposition and in the pressure disposition of the piston the coupling unit permits relative movement between the valve unit and the piston; and
wherein the valve unit includes a valve body, and wherein the valve body is acted on by a compression spring, wherein the compression spring abuts against the piston;
wherein the compression spring is provided outside the piston.

41. The transmitter unit of claim 40, wherein the single piece alone guides movement of the piston.

42. Transmitter unit according to claim 40, wherein the compression spring surrounds the piston.

43. Transmitter unit according to claim 40, further comprising a piston compression spring that acts on the piston separate from said compression spring, wherein the piston compression spring is provided in the pressure chamber.

44. Transmitter unit, comprising a housing body, a piston which is arranged in a cylinder chamber of the housing body able to move between a starting disposition and a pressure disposition, a pressure chamber bounded by the housing body and the piston, a reservoir for the supply of hydraulic fluid connected by a connection channel to the pressure chamber, a valve unit, which in an open position opens the connection channel between the reservoir and the pressure chamber and in a closed position closes the connection channel, as well as a connection opening for the routing of pressurized hydraulic fluid from the pressure chamber, wherein the connection opening is provided in the housing body, in a functional orientation of the transmitter unit, the connection channel opens into a highest end region of the pressure chamber in regard to a direction of gravity,
wherein the housing body is a single piece providing a guiding section for guiding the piston, wherein opposed axial ends of the piston are entirely contained axially within the single piece for axial sliding movement therein;
wherein the piston and the valve unit are coupled by a coupling unit, and
wherein the coupling unit couples the piston and the valve unit so that the coupling unit holds the valve unit in the open position when the piston is in the starting disposition and in the pressure disposition of the piston the coupling unit permits relative movement between the valve unit and the piston; and
wherein the valve unit includes a valve body, and wherein the valve body is acted on by a compression spring, wherein the compression spring abuts against the piston;
wherein the compression spring surrounds the piston.

45. Transmitter unit according to claim 44, wherein a part of the piston that is surrounded by the compression spring is a part of the coupling unit.

46. Transmitter unit according to claim 44, wherein a guide body of the piston is free of the compression spring and mounted slidable along the guiding section of the housing body.

\* \* \* \* \*

UNITED STATES PATENT AND TRADEMARK OFFICE
CERTIFICATE OF CORRECTION

PATENT NO. : 10,744,986 B2  
APPLICATION NO. : 15/209999  
DATED : August 18, 2020  
INVENTOR(S) : Stefan Ruckh Page 1 of 1

It is certified that error appears in the above-identified patent and that said Letters Patent is hereby corrected as shown below:

In the Claims

In Column 20, Claim 34, Line 45, reads "coupes" and should read "couples".

In Column 20, Claim 34, Lines 53 - 54, reads "piston," and should read "piston;".

In Column 20, Claim 34, Line 62, reads "transmitter unit," and should read "transmitter unit;".

Signed and Sealed this  
Tenth Day of November, 2020

Andrei Iancu  
*Director of the United States Patent and Trademark Office*